No. 747,507. PATENTED DEC. 22, 1903.
B. W. THACH.
PEA HARVESTER.
APPLICATION FILED APR. 21, 1903.
NO MODEL. 5 SHEETS—SHEET 3.
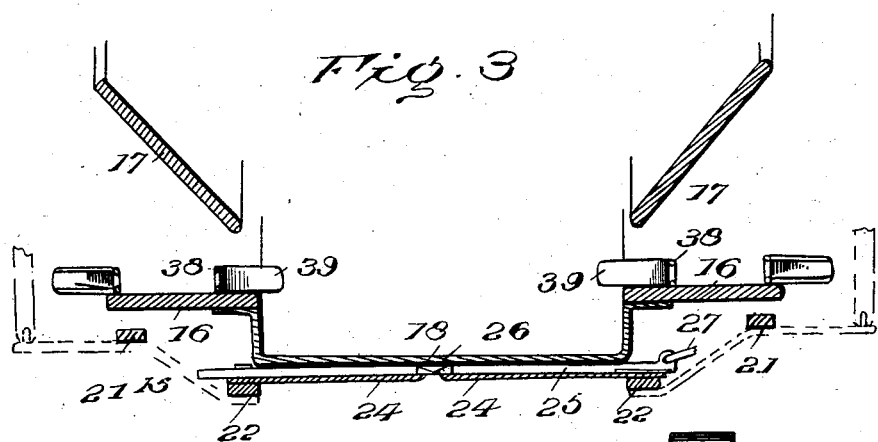
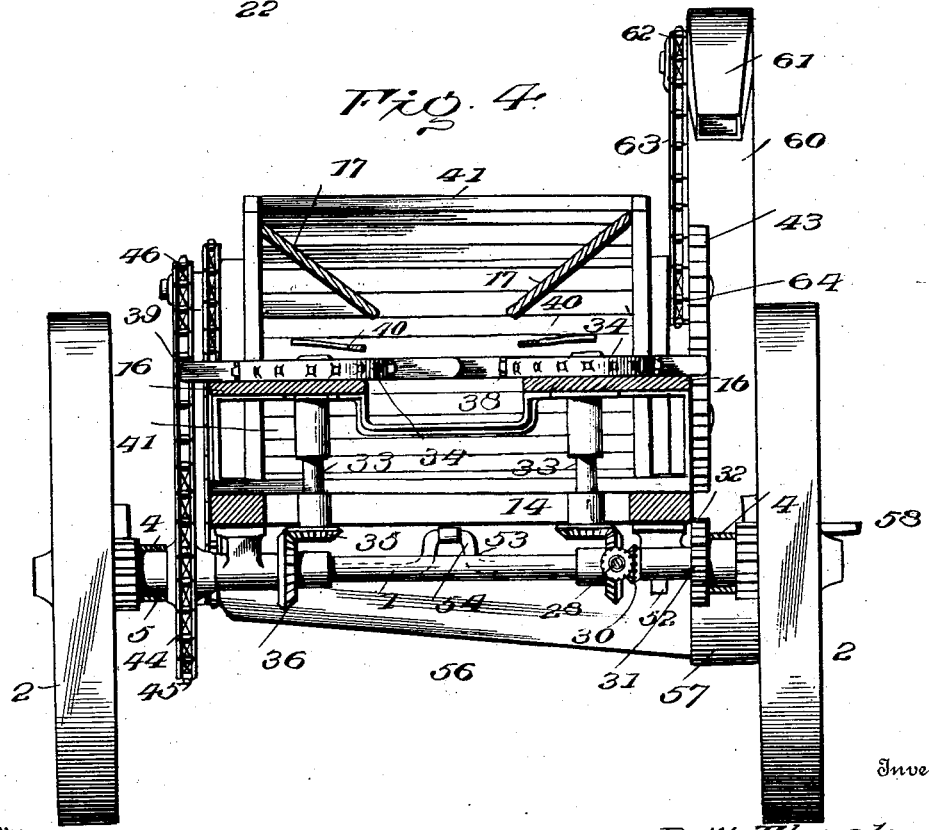

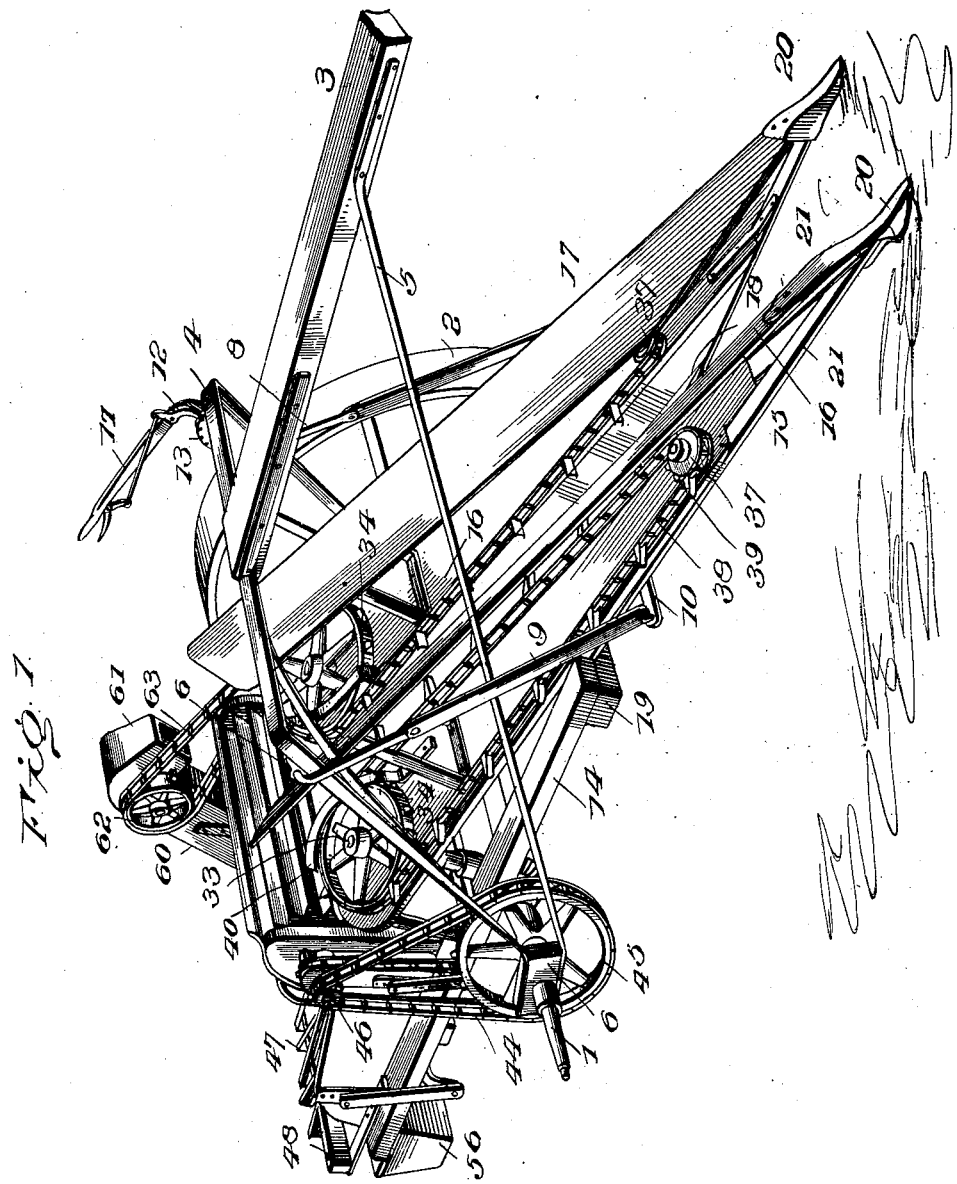

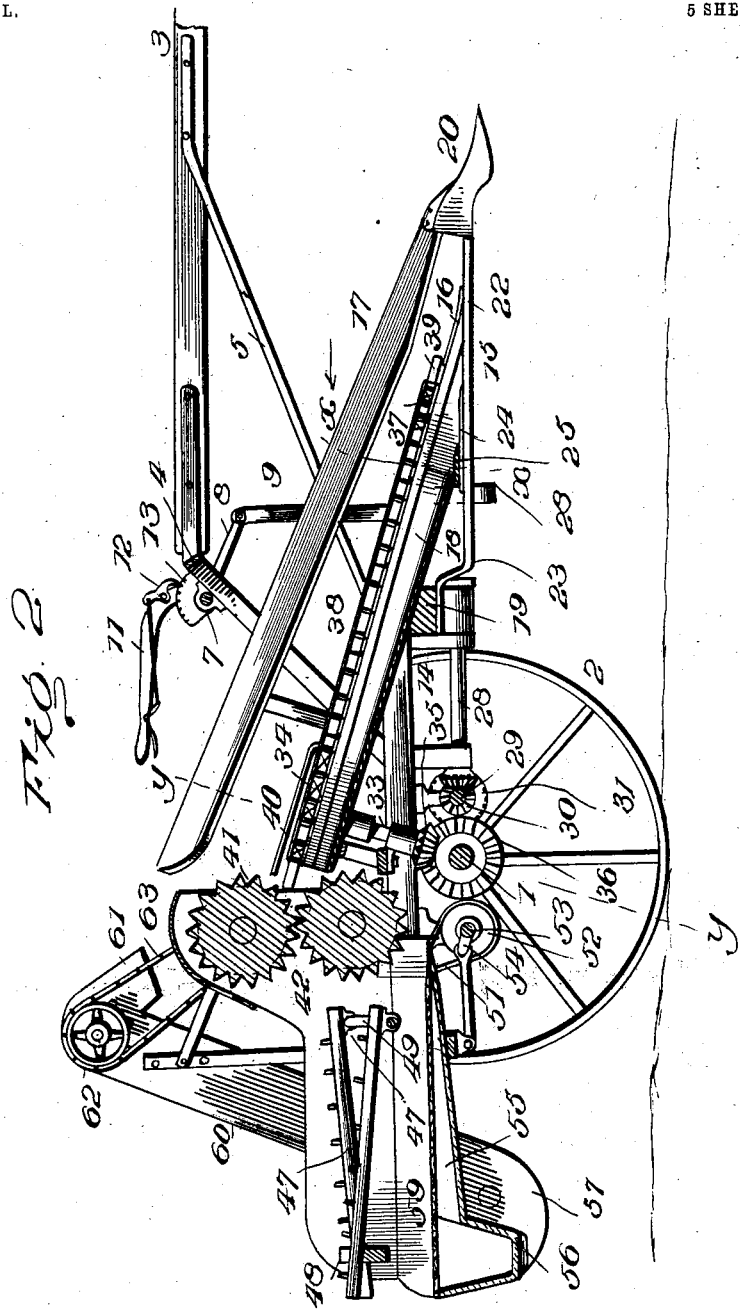

No. 747,507. PATENTED DEC. 22, 1903.
B. W. THACH.
PEA HARVESTER.
APPLICATION FILED APR. 21, 1903.
NO MODEL. 5 SHEETS—SHEET 4.
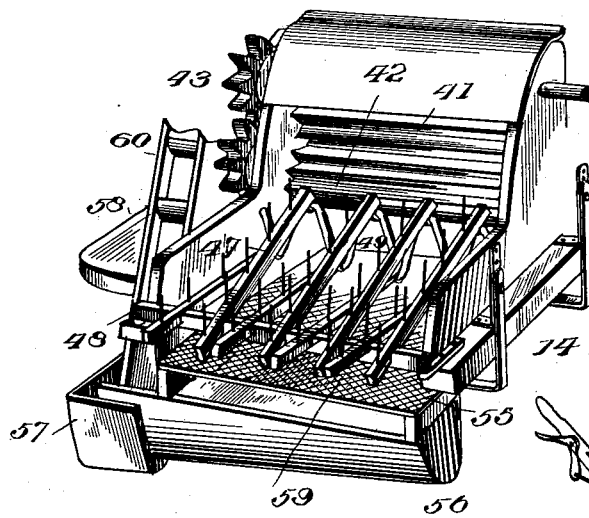
Fig. 5.
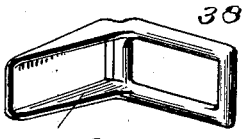
Fig. 6.
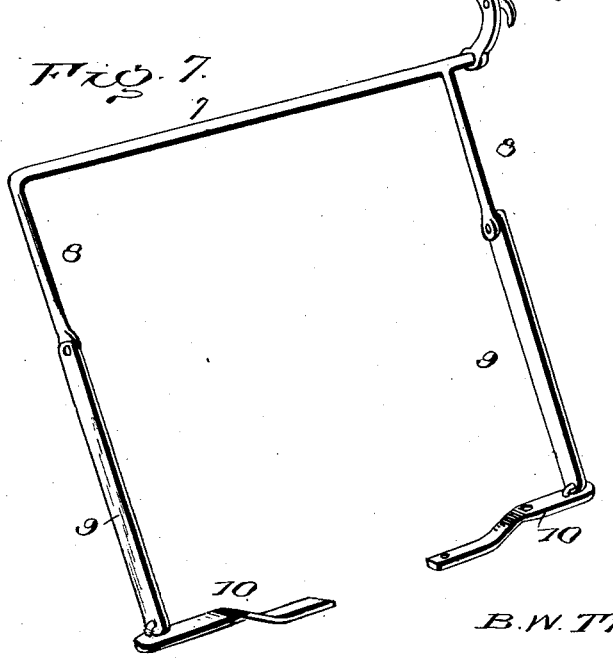
Fig. 7.
Fig. 8.
Witnesses
Emily H. England.
Inventor
B. W. Thach
By Lacey
Attorneys No. 747,507. PATENTED DEC. 22, 1903.
B. W. THACH.
PEA HARVESTER.
APPLICATION FILED APR. 21, 1903.
NO MODEL. 5 SHEETS—SHEET 5.
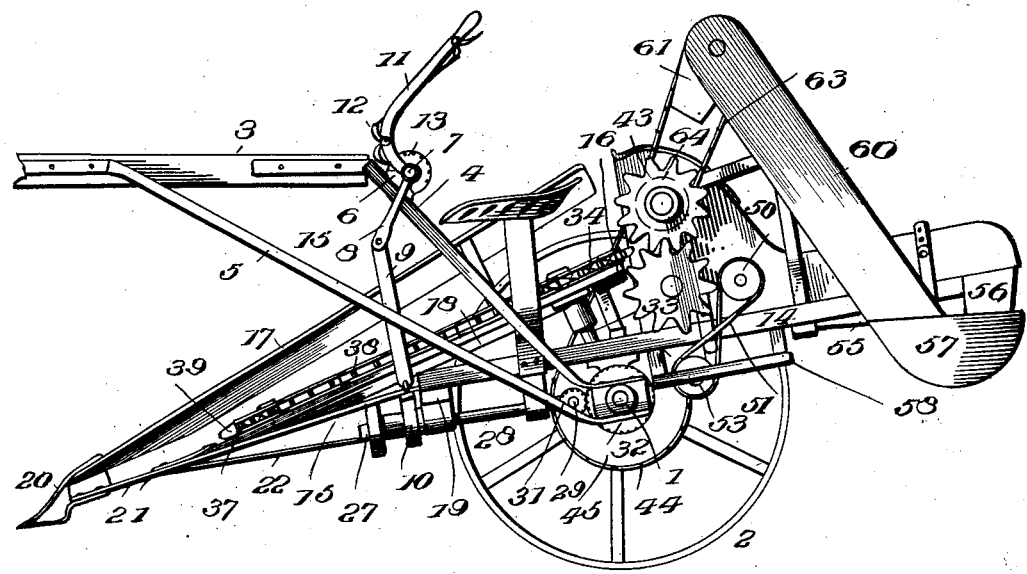
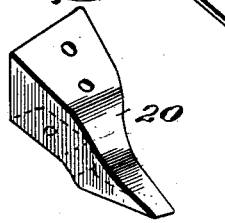
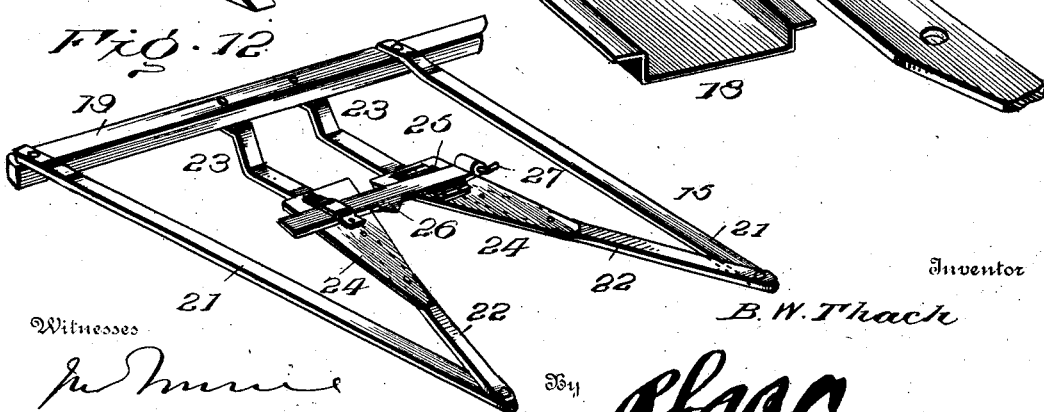
Witnesses
Emily H. England.
Inventor
B. W. Thach
By R. S. & A. B. Lacey
Attorneys No. 747,507. Patented December 22, 1903.

UNITED STATES PATENT OFFICE.

BENJAMIN W. THACH, OF HERTFORD, NORTH CAROLINA.

PEA-HARVESTER.

SPECIFICATION forming part of Letters Patent No. 747,507, dated December 22, 1903.

Application filed April 21, 1903. Serial No. 153,656. (No model.)

*To all whom it may concern:*

Be it known that I, BENJAMIN W. THACH, a citizen of the United States, residing at Hertford, in the county of Perquimans and State of North Carolina, have invented certain new and useful Improvements in Pea-Harvesters, of which the following is a specification.

This invention devises a machine of novel construction for harvesting peas, beans, and like crop and at the same time hulling and separating same and depositing them in a sack or other receptacle, the vines and hulls being discharged upon the ground in the rear of the machine.

The machine is essentially a field implement, and the working parts derive their motion from traction of one or both ground-wheels with the ground. The implement embodies in its organization cutting mechanism, flutted crushing-rolls for breaking the hulls or pods, carrying means for positively moving the vines to the crushing-rolls, toothed bars for loosening and lightening the vines to shake all peas therefrom and throw the vines from the machine, a separator to remove all portions of the hulls and pieces of vines from the peas before sacking same, and an elevator for carrying the peas upward to deposit them in a sack or other receptacle.

For a full description of the invention and the merits thereof and also to acquire a knowledge of the details of construction of the means for effecting the result, reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a harvesting machine embodying the invention. Fig. 2 is a central longitudinal section. Fig. 3 is a transverse section of the machine about on the line X X of Fig. 2 looking toward the rear, showing the parts on a larger scale. Fig. 4 is a transverse section about on the line Y Y of Fig. 2 looking toward the rear. Fig. 5 is a detail perspective view of the rear portion of the machine, showing the crushing-rolls, toothed bar, and separating means. Fig. 6 is a detail perspective view of a link of the carrier-chain, showing an arm projected therefrom for positive engagement with the vines. Fig. 7 is a detail perspective view of the means for raising and lowering the front end of the machine to suit the height of the parts from the ground. Fig. 8 is a detail view showing the gearing for transmitting motion from the axle to the cutter. Fig. 9 is a side elevation of the machine viewed from the side having the elevator. Fig. 10 is a detail perspective view of the trough and a lateral side board coöperating therewith. Fig. 11 is a detail perspective view of a lifting-point. Fig. 12 is a detail perspective view of the frame forward of the transverse bar at the lower front end of the machine.

Corresponding and like parts are referred to in the following description and indicated in all the views of the drawings by the same reference characters.

The framework of the machine provided with the operating parts is mounted upon axle 1 so as to turn thereon to admit of the front end being raised and lowered. The ground-wheels 2 are loosely mounted upon the spindles or axle-arms and are connected therewith by ratchet mechanism in the ordinary way to admit of backward rotation of the ground-wheels without imparting movement to the axle. Axle 1 is mounted for rotation and power is taken therefrom for driving the operating parts.

The pole or tongue 3 is connected to axle 1 by arch 4 and braces 5, the lower rear ends of parts 4 and 5 being firmly attached to blocks or bearings 6 in which axle 1 is mounted. Transverse shaft 7 is journaled to arch 4 and is provided at its ends with arms 8, which are connected by links 9 with bars 10, secured to the framework of the machine. Operating-lever 11 is made fast to shaft 7 and is provided with hand-latch 12 for coöperation with toothed segment 13, applied to arch 4 for holding shaft 7 and the main frame in an adjusted position.

The main frame comprises, essentially, two parts, carrying-frame 14 and elevating-frame 15, the latter being upwardly and rearwardly inclined and provided with the cutting and feeding devices and the carrying-frame supporting the crushing-rolls, toothed bars for discharging the vines and hulls, the separating mechanism, and the elevator for delivering the peas, beans, or the like into the sack or receptacle arranged to receive the same.

The elevating-frame comprises longitudinal boards 16, having a forward and downward inclination and rearwardly converged, guide-boards 17, located above boards 16 and upwardly diverged, and trough 18, the latter having its sides outwardly flanged and underlapping boards 16 and secured thereto. Transverse bar 19 connects the lower forward ends of boards 16, and frames project therefrom and support the cutting mechanim and have the lifting-points 20 applied thereto. Points 20 flare rearwardly and outwardly and are adapted to engage under the vines, as the machine is drawn over the field, to lift same and direct them into the space formed between board 16 and guide 17. The frames extended forward from transverse bar 19 are of like formation, and each consists of longitudinal bar 21 and inclined bar 22, bars 21 and 22 being connected at their front ends and spread at their rear ends. The inner bars 22 have offset 23 near their rear ends, whereby bars 22 are in a lower plane than bars 21 and carry the cutter mechanism, which is thereby enabled to come close to the surface of the ground, so as to cut the vines as close as possible. Blades 24 are secured to bars 22, and bar 25 is mounted in suitable guides applied to blades 24, so as to be directed in its reciprocating movements, said bar being provided with cutter 26 for coöperation with blades 24. Reciprocating movement is imparted to bar 25 from shaft 28 by means of pitman 27, connected by crank to shaft 28. Shaft 28 is connected at its rear end to counter-shaft 29 by means of bevel-gearing 30, and pinion 31, secured to shaft 29, is in mesh with gear-wheel 32, secured to axle 1. It will thus be seen that the cutting mechanism is actuated directly from the axle.

Upright shafts 33 are mounted in bearings of the carrying and elevating frames and are provided at their upper ends with sprocket-wheels 34 and at their lower ends with bevel-gears 35, in mesh with corresponding bevel-gears 36, secured to axle 1. Sprocket-wheels 37 are journaled to the side members of the elevating-frame and are of less diameter than sprocket-wheels 34. Feed-chains 38 are supported by sprocket-wheels 34 and 37, and their inner portions are adapted in the operation of the machine to travel upward and rearward, so as to carry the vines from the cutting mechanism to the crushing-rolls. Feed-chains 38 are composed of a series of links, certain ones of which are provided with lateral arms 39 to make positive engagement with the vines and move the same upward and rearward. Stripper-bars 40 are arranged adjacent to the inner edge portions of sprocket-wheels 34, so as to prevent the vines following the feed-chains in their travel around same. The lifting-points 20 are constructed substantially as shown and the longitudinal parts comprising the elevating-frame have connection therewith in about the manner illustrated.

The crushing-rolls 41 and 42 are mounted in parallel relation one above the other in such a manner with reference to the elevating-frame so as to receive the vines from the feed-chains. These crushing-rolls are longitudinally fluted, the ribs being approximately of V form and arranged to intermesh without touching, thereby insuring crushing or breaking of the hulls or parts, so as to liberate the peas, beans, or the like. The crushing-rolls are connected at one end by long-toothed gearing 43 and motion is imparted to one of the crushing-rolls directly from the axle by means of drive-chain 44, passing around sprocket-wheel 45, secured to axle 1, and sprocket-wheel 46, secured to extended journal of crushing-roll 41. In the operation of the machine the contiguous portions of the crushing-rolls travel rearward, so as to draw the vines therebetween from the elevating-frame and deliver them upon the delivery mechanism, consisting of a series of toothed bars 47, arranged for reciprocal movement in alternation.

The toothed bars 47 have their rear ends mounted in openings of transverse bar 48 and their front ends mounted in crank portions of crank-shaft 49, the cranks of said shaft extending in opposite directions in alternation, so as to impart a combined up-and-down and reciprocating movement to the series of toothed bars in alternation, whereby the vines and hulls are vibrated to dislodge the peas therefrom and are positively discharged from the machine in the rear thereof. Crank-shaft 49 is provided at one end with band-pulley 50, connected by cross-belt 51 with band-pulley 52 at the end of shaft 53, arranged parallel with axle 1 and provided intermediate of its ends with crank 54, from which motion is taken to operate the separating-shoe.

The separating-shoe 55 is located in the rear of the crushing-rolls and below the discharging and shaking devices and is adapted to have a vibratory movement imparted thereto to separate the peas from the hulls and short pieces of vines dropping from toothed bars 47. Separating-shoe 55 is provided at its rear end with transverse trough 56, which inclines and is provided at one end with pit 57, into which the peas find their way and from which they are elevated and deposited in the sack or other receptacle (not shown) placed upon platform 58 at the same side of the machine with the elevator. Separating-screen 59 is applied to the upper portion of the separating-shoe and the meshes therein are of a size to admit of the largest-sized peas, beans, and the like passing freely therethrough, the hulls and portions of vines too large to pass through the meshes or openings of the screen being directed rearward and deposited in the wake of the machine.

The elevator 60 at one side of the machine is of ordinary construction and is provided at its upper end with spout 61, through which the peas or the like are discharged into the sack or receptacle (not shown) placed upon the platform 58. The elevator is operated by means of sprocket-wheel 62 and drive-chain 63, the latter passing around sprocket-wheel 64 on the journal of crushing-roll 41.

In the operation of the machine the vines are severed by the cutting mechanism and are carried or fed to the crushing-rolls by the feed-chains 38, the crushing-rolls breaking the parts or hulls and liberating the peas, which are shaken from the hulls by the toothed bars 47, which constitute the discharging mechanism. The peas, with small particles of hulls and vines, drop through the spaces formed between the elements of the discharging mechanism and are received upon screen 59, which effects a separation, the peas dropping into the shoe and passing to trough 56, thence to the elevator and into the sack or receptacle in the manner stated, the hulls and portions of the vines dropping from screen 59 upon the ground in the rear of the machine.

Having thus described the invention, what is claimed as new is—

1. In a harvester of the type set forth, and in combination with the axle provided with ground-wheels, a framework mounted upon said axle to turn thereon and provided with operating mechanism deriving motion from said axle, a pole or tongue, an arched bar and braces connecting said pole with the axle, a shaft journaled to the arched bar and provided with arms at its ends, links connecting said arms with the main frame, an operating-lever connected to said shaft to effect a raising and a lowering of the front end of the frame, and means for securing the shaft and frame in an adjusted position, substantially as set forth.

2. In a harvester of the character described, an elevating-frame comprising similar side members each comprising a board, a guide above said board and a feed-chain operating between said guide and board, a trough connecting the side members, and frames projecting from the lower front ends of said boards and guides and terminating in lifting-points and having cutting mechanism applied thereto, substantially as described.

3. In a harvester of the character described, the combination of upwardly and rearwardly inclined boards, feed-chains coöperating therewith, frames extended forward of said boards and comprising companion bars, the inner bars having offsets near their rear ends, and cutting mechanism applied to said inner bars in advance of the offsets, substantially as specified.

4. In a harvester of the character described, the combination of side members, frames projected forward from said side members and having their inner elements depressed, fixed cutters applied to the depressed portions of said frames, and a bar mounted to reciprocate upon the fixed cutters and provided with a cutter for coöperation therewith, substantially as and for the purpose set forth.

In testimony whereof I affix my signature in presence of two witnesses.

BENJAMIN W. THACH. [L. S.]

Witnesses:
GEORGE G. WATT,
GENEVIEVE MATTHEWS.